United States Patent Office 3,048,587
Patented Aug. 7, 1962

3,048,587
2-ALKYLAMINO-4-AMINOPYRIMIDINE
William Oroshnik, Plainfield, N.J., assignor to Ortho Pharmaceutical Corporation, a corporation of New Jersey
No Drawing. Filed Oct. 17, 1960, Ser. No. 62,869
6 Claims. (Cl. 260—256.4)

This application is a continuation-in-part of my copending patent application Serial No. 856,948, filed December 3, 1959, and now abandoned, which in turn is a continuation-in-part of Serial No. 782,664, filed December 24, 1958, now abandoned.

This invention relates to a new series of organic compounds. More particularly, it is concerned with 2-R-amino-4-aminopyrimidines and methods for their preparation.

It is generally conceded that compounds having a pyrimidine nucleus are widely applicable in the pharmaceutical field. It is also known that very small changes in the structure of pyrimidine compounds, as for example an increase or decrease in the chain length of a substituent on the pyrimidine nucleus, may cause sharp changes in physiological effects. Known pyrimidines which are of particular concern in connection with the subject matter of the present application are the 2,4-diaminopyrimidines of English et al. described in United States Patent No. 2,416,617 which have bacteriostatic activity. Also known are pyrimidines substituted at the 4-position of the pyrimidine nucleus by one or more amino-substituted alkylamine groups, as for example the compounds described by Adams et al. in United States Patent No. 2,455,396 which are useful as internal antiseptics. The 2-amino-4-methyl-6-alkylaminopyrimidines described by Kyrides et al. in United States Patent No. 2,674,598 are stated to be applicable in the treatment of tuberculosis and as activators of rubber vulcanization accelerators. Finally, the 2-amino-4-cyclohexamino-5-benzylpyrimidine described by Goldberg in United States Patent No. 2,723,976 is stated to possess analeptic action.

A new group of 2-R-amino-4-aminopyrimidines has now been discovered. The novel compounds are structurally and functionally distinguishable from the prior art pyrimidines. They are useful as anticonvulsants, as determined by the anticonvulsive assay of Swinyard, Brown and Goodman, J. Pharm. and Exp'tl. Therap., 106, 319, 1952, against electroshock. The table below shows the desirable pharmacological properties of the novel 2-R-amino-4-aminopyrimidines.

TABLE I

*Anticonvulsant Action of 2-R-Amino-4-Aminopyrimidines Against Maximal Electroshock in Mice*

| R | $ED_{50}$,[1] mgm./kg. | $NTD_{50}$,[2] mgm./kg. | Protective Index[3] |
|---|---|---|---|
| Octyl | 84 | 125–250 | 1.5–3.0 |
| Nonyl | 35 | 125–250 | 3.6–7.2 |
| Decyl | 33 | 75–125 | 2.25–3.38 |
| Undecyl | 21 | 350–500 | 16–24 |
| Dodecyl | 140 | 250–500 | 1.8–3.6 |

[1] $ED_{50}$=50% effective dose.
[2] $NTD_{50}$=50% neurotoxic dose.
[3] Protective Index=$NTD_{50}/ED_{50}$.

Moreover, the compounds belonging to the novel series have a high $LD_{50s}$, these being in the range from about 500 to about 1000 mgm./kg. Thus, it is apparent that the cumulative effect of these properties renders the claimed compounds superior anticonvulsants.

The novel 2-R-amino-4-aminopyrimidines of this invention are those wherein the R substituent attached to the nitrogen atom in the 2-position is a saturated aliphatic group having from eight to thirteen carbon atoms, as for example octyl, nonyl, decyl, undecyl, dodecyl and tridecyl. The novel compounds may be used either in the form of free bases or in the form of salts thereof with inorganic acids such as hydrohalic, i.e. hydrochloric, hydrobromic or hydriodic acid; sulfuric, nitric or a phosphoric acid; or with organic acids such as acetic, propionic, glycolic, lactic, pyruvic, oxalic, malonic, succinic, maleic, fumaric, malic, tartaric, citric, benzoic, cinnamic, mandelic, methanesulfonic, ethanesulfonic, hydroxyethanesulfonic, benzenesulfonic, p-toluene sulfonic, p-aminosulfonic, 2-phenoxybenzoic or 2-acetoxybenzoic acid. The compounds may be employed either in the form of aqueous solutions or, if preferred, in the form of creams, ointments, pastes, emulsions, suspensions or similar pharmaceutical compositions.

The novel compounds are prepared by reacting the appropriate 2-halo-4-aminopyrimidine, preferably 2-chloro-4-aminopyrimidine in the presence of a suitable solvent, as for example a lower alkanol, e.g., ethanol, methanol or butanol with the appropriate secondary amine, i.e. aliphatic amine containing from eight to thirteen carbon atoms. The mixture is refluxed for a suitable period of time, conveniently for about twelve to twenty-four hours and the solvent is removed by distillation or other suitable means. The desired base is extracted with an organic solvent, for example ether, from which it is removed by distillation under reduced pressure. The resulting crude base, in the form of an oily residue, is then converted to a suitable salt, as for example one of those mentioned above, by reaction with one equivalent of the acid in a lower alkanol. The resulting salts, the succinate being prefered, are white crystalline compounds, soluble in water.

The following examples illustrate in further detail the methods for the preparation of the novel compounds of this invention but are not to be construed as limiting the scope thereof.

EXAMPLE I

Seven parts by weight 2-chloro-4-aminopyrimidine and 12 parts by weight octyl amine are stirred and refluxed in 100 parts by volume butanol for eighteen hours. The butanol is then removed by distillation at 15 mm. and the oily residue is shaken with 250 parts by volume ether and 50 parts by volume of 10% sodium hydroxide. The ether layer is removed, dried over anhydrous potassium carbonate and the ether evaporated. The oily residue is distilled under vacuum, collecting 2-n-octylamino-4-aminopyrimidine at 180° C. at 0.02 mm. Hg. The pyrimidine is characterized as its succinate salt, which is prepared by dissolving the pyrimidine base and one equivalent of succinic acid in hot isopropanol and allowing to cool. The crystals which deposit are removed by filtration and recrystallized from isopropanol. Melting point: 150–151° C.

Analysis of succinate for $(C_{12}H_{22}N_4)_2(C_4H_6O_4)$:

| | Theory | Found |
|---|---|---|
| C | 59.76 | 60.07 |
| H | 8.96 | 9.05 |

EXAMPLE II

Five parts by weight 2-chloro-4-aminopyrimidine and 10 parts by weight n-nonylamine are stirred and refluxed in 35 parts by volume absolute ethanol for nineteen hours. The ethanol is removed by distillation under vacuum. To the solid residue is added 35 parts by volume chloroform and enough ether to dissolve the solids. This solution is shaken with 35 parts by volume of 5% sodium hydroxide.

The layers are separated, and the aqueous layer is re-extracted with ether. The extracts are combined and the solvents removed by vacuum distillation. The residue is distilled collecting the 2-nonylamino-4-aminopyrimidine at 165° C. at 0.001 mm. Hg. The pyrimidine is characterized as its succinate salt by dissolving it and one equivalent of succinic acid in hot ethanol and collecting the crystals which deposit on cooling. Recrystallization of the succinate salt from acetone yields a succinate which has a melting point of 149–149.5° C.

Analysis of succinate for $(C_{13}H_{24}N_4)_2(C_4H_6O_4)$:

|   | Theory | Found |
|---|---|---|
| C | 60.99 | 61.22 |
| H | 9.21 | 9.36 |

EXAMPLE III

Seven parts by weight 2-chloro-4-aminopyrimidine and 20 parts by volume n-decyl amine are stirred and refluxed in 100 parts by volume n-butanol for eighteen hours. The butanol is removed by vacuum distillation, and the residue is shaken with ether and excess aqueous sodium hydroxide solution. The ether layer is separated, the ether is evaporated and the residue distilled. The fraction collected at 180–185° C. at 0.01 mm. Hg is 2-n-decyl-4-aminopyrimidine. The pyrimidine is characterized as its succinate salt, which is prepared by dissolving the base and an equivalent of succinic acid in hot methanol, and recrystallizing the crystals which deposit on cooling from isopropanol. Melting point: 149.5–150.0 C.

Analysis of succinate for $(C_{14}H_{26}N_4)_2(C_4H_6O_4)$:

|   | Theory | Found |
|---|---|---|
| C | 62.10 | 62.20 |
| H | 9.46 | 9.44 |

EXAMPLE IV

Seven parts by weight 2-chloro-4-aminopyrimidine and 35 parts by weight undecylamine hydrobromide are stirred in 100 parts by volume n-butanol and 5.6 parts by weight sodium hydroxide dissolved in three parts by volume water are added hot. The reaction mixture is heated to reflux, and the refluxing is continued for eighteen hours. After cooling, 250 parts by volume ether is added, and the solution is shaken with excess 40% alkali. The ether layer is separated, dried over anhydrous potassium carbonate and the solvents distilled. The residue is distilled, collecting 2-undecylamino-4-aminopyrimidine at 160–190° C. at 0.01 mm. Hg. The pyrimidine is characterized as its succinate which is prepared by dissolving the pyrimidine base and one equivalent of succinic acid in hot methanol and allowing the solution to cool. The crystals which deposit are recrystallized from isopropanol after which the melting point is 151–152° C.

Analysis of succinate for $(C_{15}H_{28}N_4)_2(C_4H_6O_4)$:

|   | Theory | Found |
|---|---|---|
| C | 63.12 | 63.14 |
| H | 9.67 | 9.68 |

EXAMPLE V

Five parts by weight 2-chloro-4-aminopyrimidine, 30 parts by weight dodecylamine and 100 parts by volume n-butanol are stirred together at reflux for eighteen hours. The reaction mixture is cooled, diluted with 250 parts by volume ether, and shaken with excess aqueous 40% sodium hydroxide. The ether layer is separated, dried over anhydrous potassium carbonate, and the solvents removed by distillation. The residue is distilled collecting 2-dodecylamino-4-aminopyrimidine at 190–195° C. at 0.2 mm. Hg. The pyrimidine is characterized as its succinate salt by dissolving 11.4 parts by weight of base, and 2.5 parts by weight succinic acid in hot isopropanol, and refluxing fifteen minutes. On cooling, a mass of crystals is deposited which is recrystallized from isopropanol, and has a melting point of 148–149° C.

Analysis of succinate for $(C_{16}H_{30}N_4)_2(C_4H_6O_4)$:

|   | Theory | Found |
|---|---|---|
| C | 64.05 | 64.13 |
| H | 9.86 | 9.84 |

EXAMPLE VI

Five parts by weight 2-chloro-4-aminopyrimidine, 15 parts by weight n-tridecylamine and 65 parts by volume ethanol are stirred and refluxed together for twenty-one hours, after which the ethanol is distilled off. The residue which is solid is dissolved in ether, shaken with excess 10% sodium hydroxide and the ether layer separated. After evaporation of the ether the residue is distilled, collecting 2-tridecylamine-4-aminopyrimidine at 185–190° C. at 0.001 mm. Hg. The pyrimidine is characterized as its succinate salt by dissolving the base and 1.05 parts by weight succinic acid in 40 parts by volume ethanol. The solution after refluxing fifteen minutes is allowed to cool. The crystals which deposit are removed by filtration, and recrystallized from 40 parts by volume ethanol, obtaining 4.2 parts by weight of succinate which has a melting point of 148–149.5° C.

Analysis of succinate for $(C_{17}H_{32}N_4)_2(C_4H_6O_4)$:

|   | Theory | Found |
|---|---|---|
| C | 64.92 | 65.14 |
| H | 10.04 | 10.11 |

What is claimed is:
1. A member selected from the group consisting of 2-R-amino-4-aminopyrimidine wherein R is an alkyl chain having from eight to thirteen carbon atoms, and therapeutically active acid addition salts thereof.
2. The compound 2-N-octylamino-4-chloropyrimidine.
3. The compound 2-N-nonylamino-4-aminopyrimidine.
4. The compound 2-N-decylamino-4-aminopyrimidine.
5. The compound 2-undecylamino-4-aminopyrimidine.
6. The compound 2-dodecylamino-4-aminopyrimidine.

References Cited in the file of this patent

UNITED STATES PATENTS

| 2,674,598 | Kyrides et al. | Apr. 6, 1954 |
| 2,845,425 | Whitehead et al. | July 29, 1958 |